(12) United States Patent
Almoric et al.

(10) Patent No.: US 8,461,068 B2
(45) Date of Patent: Jun. 11, 2013

(54) GLASS CERAMICS WITH BULK SCATTERING PROPERTIES AND METHODS OF MAKING THEM

(75) Inventors: Etienne Almoric, Fontainebleau (FR); Marie Jacqueline Monique Comte, Fontenay aux Roses (FR); Micaela Nazaraly, Le Blanc Mesnil (FR); Lothar Wondraczek, Erlangen (DE)

(73) Assignee: Corning Incorporated, Corning, NY (US)

( * ) Notice: Subject to any disclaimer, the term of this patent is extended or adjusted under 35 U.S.C. 154(b) by 42 days.

(21) Appl. No.: 12/759,147

(22) Filed: Apr. 13, 2010

(65) Prior Publication Data

US 2011/0212824 A1 Sep. 1, 2011

(30) Foreign Application Priority Data

Feb. 26, 2010 (EP) .................................... 10305198

(51) Int. Cl.
*C03C 10/12* (2006.01)
(52) U.S. Cl.
USPC ........ 501/4; 501/7; 65/33.1; 65/33.7; 65/33.8
(58) Field of Classification Search
USPC ........................... 501/4, 7; 65/33.1, 33.7, 33.8
See application file for complete search history.

(56) References Cited

U.S. PATENT DOCUMENTS

| | | | |
|---|---|---|---|
| 3,380,818 A | 4/1968 | Smith | |
| 3,490,984 A | 1/1970 | Petticrew et al. | 161/6 |
| 3,573,074 A | 3/1971 | Duke et al. | 106/39 |
| 3,907,577 A | 9/1975 | Kiefer et al. | 106/39.7 |
| 4,341,543 A | 7/1982 | Andrus et al. | 65/30.1 |
| 5,084,328 A | 1/1992 | Fine et al. | 428/212 |
| 5,096,862 A * | 3/1992 | Mathers et al. | 501/96.1 |
| 6,706,653 B2 | 3/2004 | Comte | 501/4 |
| 6,750,167 B2 | 6/2004 | Kitamura et al. | 501/4 |
| 7,276,848 B2 | 10/2007 | Cok et al. | 313/504 |
| 7,507,681 B2 * | 3/2009 | Aitken et al. | 501/4 |
| 7,605,099 B2 | 10/2009 | Wolff et al. | 501/51 |
| 8,043,985 B2 * | 10/2011 | Yagi et al. | 501/4 |
| 2002/0022563 A1 | 2/2002 | Schweiger et al. | |
| 2002/0026932 A1 | 3/2002 | Mitra et al. | 126/39 |
| 2003/0054935 A1 | 3/2003 | Kitamura et al. | 501/4 |

(Continued)

FOREIGN PATENT DOCUMENTS

| | | |
|---|---|---|
| CA | 2299202 | 8/2000 |
| CS | 188541 | 3/1979 |

(Continued)

OTHER PUBLICATIONS

"OLEDs for lighting applications"; SPIE; Proc. of SPIE vol. 7051; 70511A-1 through 70511A-9; van Elsbergen et al.

(Continued)

*Primary Examiner* — Karl Group
(74) *Attorney, Agent, or Firm* — Jason A. Barron; Lisa M. Noni

(57) ABSTRACT

Described herein are glass ceramic compositions with bulk scattering properties that have improved light extraction properties due to high levels of diffuse transmission, and methods of making such glass ceramic compositions. The compositions are based on $Li_2O$—$Al_2O_3$—$SiO_2$ glass ceramics and with the proper crystal size, exhibit good volume scattering characteristic for visible light and enhance the outcoupling from the substrate to the air in optical devices, such as light emitting diodes.

11 Claims, 2 Drawing Sheets

U.S. PATENT DOCUMENTS

| | | |
|---|---|---|
| 2004/0012328 A1 | 1/2004 | Arnold et al. .................. 313/504 |
| 2004/0157720 A1 | 8/2004 | Sakamoto et al. ................ 501/4 |
| 2005/0197242 A1 | 9/2005 | Mitra et al. |
| 2007/0004578 A1 | 1/2007 | Monique Comte ............... 501/4 |
| 2007/0013291 A1 | 1/2007 | Cok et al. ...................... 313/501 |
| 2007/0129231 A1 | 6/2007 | Comte |
| 2007/0213192 A1 | 9/2007 | Monique Comte et al. ...... 501/7 |
| 2007/0237935 A1 | 10/2007 | Mori et al. |
| 2007/0293386 A1 | 12/2007 | Goto |
| 2008/0026927 A1 | 1/2008 | Monique Comte ............... 501/7 |
| 2008/0084150 A1 | 4/2008 | Cok ............................... 313/110 |
| 2008/0100201 A1 | 5/2008 | Wei et al. ...................... 313/503 |
| 2008/0105882 A1 | 5/2008 | Tan et al. ........................ 257/79 |
| 2008/0207424 A1 | 8/2008 | Aitken et al. |
| 2009/0042710 A1 | 2/2009 | Minamikawa .................. 501/63 |
| 2009/0153972 A1 | 6/2009 | Nakamura et al. ............. 359/599 |
| 2009/0162608 A1* | 6/2009 | Yagi et al. ...................... 428/141 |
| 2010/0099546 A1* | 4/2010 | Aitken et al. ...................... 501/4 |
| 2010/0130342 A1 | 5/2010 | Siebers et al. |
| 2011/0136651 A1* | 6/2011 | Yagi et al. ......................... 501/7 |

FOREIGN PATENT DOCUMENTS

| | | |
|---|---|---|
| GB | 1095254 | 12/1967 |
| JP | 01052631 | 2/1989 |
| JP | 11-100229 | 4/1999 |
| JP | 11/100229 | 4/1999 |
| JP | 2000/344544 | 12/2000 |
| JP | 2000344544 | 12/2000 |
| JP | 2002154840 | * 5/2002 |
| WO | 2004/076367 | 9/2004 |
| WO | 2008065167 | * 6/2008 |

OTHER PUBLICATIONS

"Application of radiative transport theory to light extraction from organic light emitting diodes"; Shiang et al; Journal of Applied Physics; Mar. 2004; vol. 95, No. 1; p. 2880-2888.

"Light extraction from OLEDs for lighting applications through light scattering"; Bathelt et al; ScienceDirect; Organic Electronics 9 (2007) 293-299.

PCT/US11/26012 Search Report and Written Opinion, Nov. 2011.
Translation of JP11-100229 (JP1999100229), Apr. 1999.
Translation of JP2000-344544, Dec. 2000.
Translation of CS188541, Mar. 1979.
EP10305198.3 Search Report and Written Opinion, Nov. 2010.
Translation of JP01052631 (JP64-52631), Feb. 1989.
28 J. Am. Inst. Conserv. 117-25 (1989).

* cited by examiner

GLASS CERAMICS WITH BULK SCATTERING PROPERTIES AND METHODS OF MAKING THEM

This application claims the benefit of European Application, EP10305198.3, filed on Feb. 26, 2010, entitled "Glass Ceramics With Bulk Scattering Properties and Methods of Making Them."

FIELD OF THE DISCLOSURE

This disclosure relates to glass ceramics with bulk scattering properties, and to use of those glass ceramics, for example, in OLED or photovoltaic applications.

BACKGROUND

Artificial lighting consumes a significant part of all the electrical energy produced worldwide. In homes and offices from 20% to 50% of total energy usage is due to lighting. Today, the main light sources used for general lighting in private households are incandescent lamps (light bulbs and halogen lamps) and compact fluorescent lamps (energy saving lamps). For applications in the commercial sector like offices, shops, restaurants, or hotels, fluorescent lamps (tubular or compact) are the preferred choice due to their advantages in terms of power efficacy and lifetime (total cost of ownership). In addition to these traditional light sources, white LEDs start to enter the market of general lighting. OLEDs are very promising candidates to substitute conventional light sources like incandescent bulbs and fluorescent tubes. OLEDs provide potential for power-efficient large area light sources which will substantially contribute to energy efficient lighting.

To enter the general lighting market OLEDs have to achieve power efficacies of up to 90 lm/W (100 lm/W from OLED100 project) and operational lifetimes of up to 70.000 h (100 000 h from OLED 100 project) (inorganic LEDs). But the OLED technology offers more than potentially efficient and long-living light sources. To pave the road towards applications in general lighting, OLEDs are going to make use of their unique form factors allowing flat light sources covering square meters. OLEDs provide potential for large area light sources that combine revolutionary new lamp properties.

They are thin and flat and at the same time they can be transparent, colour-tuneable or flexible enabling light sources with an unprecedented grade of flexibility in terms of design and application, making them highly appealing for consumers.

The electroluminescent devices are limited by the optical extraction efficiency, the ratio of light generated within the device to light emitted into the ambient. Thus, a significant fraction of the electrically generated light is lost within the device. For an OLED, the optical extraction efficiency can be divided into two components: the efficiency of light coupling from the active layers into the substrate $\eta_{OLED-s}$ and the extraction efficiency from the substrate to the ambient $\eta_{s-a}$, i.e., $\eta_{ex} = \eta_{OLED-s} * \eta_{s-a}$.

Light extraction is one key issue, and one common problem is that the efficiency with which light may be extracted is reduced by total internal reflection at interfaces, followed by reabsorption of the reflected light: the light is generated in high index layers (n~1.8) and this light has to escape to the substrate (generally glass with n~1.5) and then finally to the air (n=1).

SUMMARY

Embodiments relate to glass ceramics with bulk scattering properties, and to use of those glass ceramics, for example, in OLED or photovoltaic applications. When used in place of a glass substrate in an OLED device, for instance, the glass ceramic increases light extraction.

One embodiment is a glass ceramic comprising: a composition comprising in weight percent; greater than 0 to 3% $Li_2O$; 15-27% $Al_2O_3$; 60-85% $SiO_2$; and greater than or equal to 1% $SnO_2$; wherein the glass ceramic exhibits diffuse transmission greater than or equal to 20% from 400-1200 nm; and wherein the glass ceramic is a bulk crystallized glass ceramic.

A second embodiment is a process for making a glass ceramic comprising: preparing a glass wherein the composition comprises, in weight percent: greater than 0 to 3% $Li_2O$; 15-27% $Al_2O_3$; 60-85% $SiO_2$; and greater than or equal to 1% $SnO_2$; heat treating the glass to nucleate and grow crystals and form the glass ceramic.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
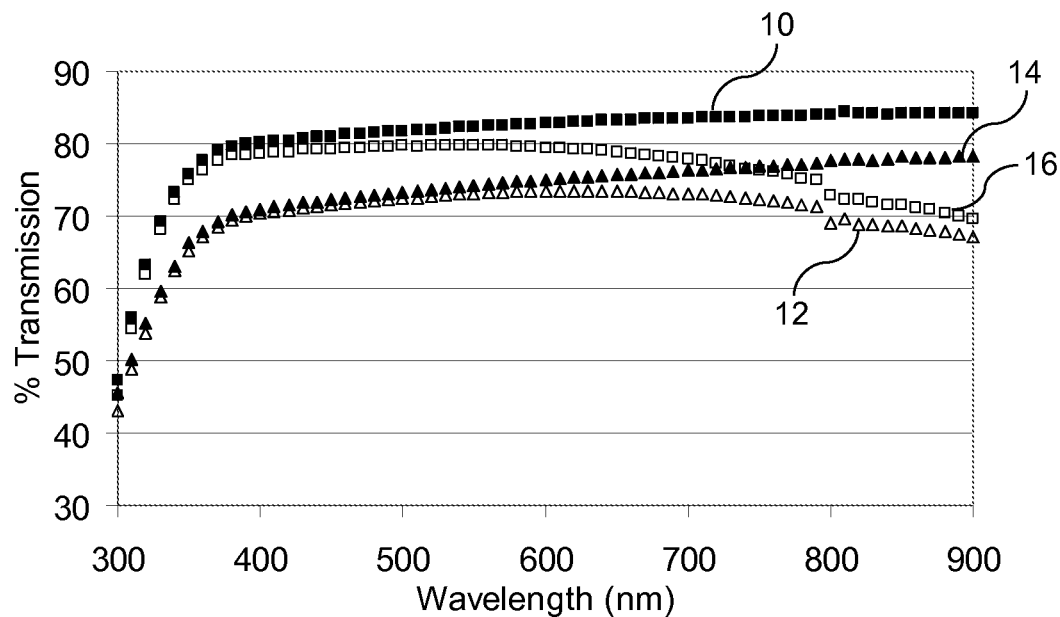
FIG. 1 is a graph of diffuse and total transmission as a function of wavelength for two embodiments, S1-B and S2-A+B.

One alternative to have scattering in the glass substrate is to use glass ceramic. The presence of particles of the proper size and index of refraction (compared to the glass index of refraction) permit the scattering. This disclosure relates to glass ceramic materials based on $Li_2O$—$Al_2O_3$—$SiO_2$ compositions. These glasses are transparent and after the thermal treatment (under 950° C.), crystals appear with the proper size and index of refraction, exhibit good volume scattering characteristic for visible light and enhance the outcoupling from the substrate to the air in an OLED cell.

One embodiment is a glass ceramic comprising: a composition comprising in weight percent, greater than 0 to 3% $Li_2O$; 15-27% $Al_2O_3$; 60-85% $SiO_2$; and greater than or equal to 1% $SnO_2$; wherein the glass ceramic exhibits diffuse transmission greater than or equal to 20% from 400-1200 nm; and wherein the glass ceramic is a bulk crystallized glass ceramic.

In another embodiment, the glass ceramic composition comprises, in weight percent, 60-85% $SiO_2$; 15-27% $Al_2O_3$; 0.5-2.9% $Li_2O$; and 1-5% $SnO_2$.

In yet another embodiment, the glass ceramic composition comprises, in weight percent, 62-82% $SiO_2$; 18-24% $Al_2O_3$; 1.9-2.5% $Li_2O$; and 1-1.5% $SnO_2$.

In some embodiments, the glass ceramic further comprises, in weight percent, 1-3% ZnO; 2-2.8% $ZrO_2$, 0-3% MgO; 0-3% BaO; 0-4% $P_2O_5$; 0-2% $Ta_2O_5$; and 0-2% $B_2O_3$.

The ranges of components in the glass ceramic composition comprise, in weight percent, any value including decimals in the range, for example, the range for $SiO_2$ includes 60-85% $SiO_2$ for instance 65-70% $SiO_2$, for example 65.1-69.3% $SiO_2$.

The glass ceramic compositions disclosed herein include $SnO_2$ as a nucleating and fining agent. $SnO_2$ can be used as a non-toxic substitute for arsenic oxide as a fining agent. $SnO_2$ can also be used as a nucleating agent instead of $TiO_2$. $TiO_2$ is generally used as a component for nucleation, but may add unwanted color to the glass ceramic.

The glass ceramic is essentially free of $TiO_2$ and/or of arsenic and fluorine in certain embodiments. The glass ceramic can include contaminants as typically found in commercially prepared glass or glass ceramics. For example, while the glass may comprise zero weight percent arsenic on an as batched basis (that is zero arsenic is added) analysis may find that the glass contains 0.05 weight percent or less of arsenic due to contamination. Such glass is considered herein as being "essentially free" of arsenic because the source of the arsenic is contamination of the batch starting materials. The same is true for $TiO_2$ and fluorine. While the glass contains zero weight percent $TiO_2$ or fluorine on the as batched basis these elements may also be present in the glass due to contamination. Contamination levels are less than 0.05 weight percent. Thus, as with arsenic, glass composition found to contain $TiO_2$ and fluorine are considered as being essentially free of these materials because their presence arises from the contamination of the starting materials and they are not intentionally added.

Total transmission is defined as light that passes effectively through a 1 mm glass sample. Diffuse transmission is defined by the amount of light that enters the glass and is deviated by an angle larger than about 7 degrees, thus considered scattered. In one embodiment, the glass ceramic has a total transmission greater than 50%, for example, greater than 60%, or greater than 80%, over the wavelength range of 400-700 nm. In one embodiment, the glass ceramic has a diffuse transmission greater than 40%, for example, greater than 50%, or greater than 65%, over the wavelength range of 400-700 nm. The above listed total and diffuse transmission values are acceptable for embodiments of the glass ceramic in OLED applications.

In another embodiment, the glass ceramic has a total transmission greater than 70%, for example, greater than 80%, over the wavelength range of 400-1200 nm. In one embodiment, the glass ceramic has a diffuse transmission greater than 20%, for example, greater than 60%, over the wavelength range of 400-1200 nm. The above listed total and diffuse transmission values are acceptable for embodiments of the glass ceramic in photovoltaic applications.

In some embodiments, the glass ceramic has 5-60 percent crystallization, for example, percent crystallization, 40 percent crystallization, or 50 percent crystallization. In some embodiments, the glass ceramic has crystals with a mean size of greater than 100 nm, for example, greater than 110 nm, 1 micron or more, or 100 nm to 2 microns.

In some embodiments, the main crystal phase in the glass ceramic comprises beta-quartz. The glass ceramic may also or alternatively contain petalite, beta-spodumene, or $ZrSnO_4$ crystals.

The glass ceramic may be made according to any appropriate technique. One embodiment is a process for obtaining a glass ceramic comprising: preparing a glass wherein the composition comprises, in weight percent: greater than 0 to 3% $Li_2O$; 15-27% $Al_2O_3$; 60-85% $SiO_2$; and greater than or equal to 1% $SnO_2$; heat treating the glass to nucleate and grow crystals and form the glass ceramic.

A thermal treatment is applied to the prepared glass to obtain a glass ceramic. The thermal treatment comprises nucleation and growth of crystals. Nucleation of the crystals generally comprises heating the glass to a temperature of 680-800° C., for example, 725° C. or 780° C. The glass may be held at the nucleation temperature for a minimum of 10 minutes. For example, the glass may be held at the nucleation temperature for 10 minutes, 15 minutes, 60 minutes, or more.

Growth generally comprises heating the glass to a temperature of 880-950° C., for example 900° C. or 925° C., for a minimum of 15 minutes. For example, the glass may be held at the growth temperature for 15 minutes, 30 minutes, 60 minutes, or more.

The glass and/or glass ceramic may be subjected to one or more thermal treatments. For example, the glass may be thermally treated with one nucleating and growth treatment, followed by a second nucleating and growth treatment. Each successive thermal treatment may consist of the same or different nucleation and growth temperatures of the previous thermal treatment.

In one embodiment, the thermal treatment includes heating the glass to 660° C. at a rate of 30° C. per minute followed by heating to 725° C. at a rate of 3° C. per minute and subsequently heating to 820° C. at a rate of 12° C. per minute. The glass is then held at 820° C. for 10 minutes. The thermal treatment also includes heating the sample to 900° C. at a rate of 15° C. per minute and holding at 900° C. for 15 minutes. The resulting glass ceramic is then allowed to cool naturally to room temperature.

In another embodiment, the thermal treatment includes heating the glass to 780° C. at a rate of 3° C. per minute, holding at 780° C. for 1 hour, then heating to 925° C. at a rate of 12 degrees per minute and holding at 925° C. for 1 hour. The resulting glass ceramic is then allowed to cool naturally at room temperature.

In another embodiment, the thermal treatment includes heating the glass to 660° C. at a rate of 30° C. per minute followed by heating to 725° C. at a rate of 3° C. per minute and subsequently heating to 820° C. at a rate of 12° C. per minute. The glass is then held at 820° C. for 10 minutes. The thermal treatment also includes heating the sample to 925° C. at a rate of 15° C. per minute and holding at 925° C. for 1 hour. Finally the glass ceramic is cooled to 600° C. at a rate of 20° C. per minute followed by natural cooling to room temperature.

In all embodiments, it is highly advised that the temperature of the thermal treatment need not exceed 950° C.

The glass ceramics as embodied above may be incorporated into or used in any appropriate environment or device. For example, embodiments of the glass ceramic may be used in an OLED device to increase light extraction. OLEDs conventionally include a substrate and several organic layers sandwiched between two electrodes, at least one of the electrodes is transparent. Applying an electric field results in charge carrier injection into the organic layers. Electrons and holes form excitons, which may decay radiatively by light emission. The organic light emitting layers are high index which limit the amount of light that can escape into the air therefore from the substrate to the air a large part of the light is trapped. Rays that hit the substrate/air interface with an angle higher than $\theta = \arcsin(\eta_{air}/\eta_{substrate})$ will be reflected due to total internal reflection. A volume scattering substrate will deviate rays that bounce multiple times in the OLED cell and eventually bring them into the escape cone. The glass ceramics described here may, for example, be used as the substrate in an OLED device.

Embodiments of the glass ceramic may also be used as a substrate, superstrate, or both, in a thin film photovoltaic device, for example, in a silicon tandem photovoltaic device as a light scattering superstrate. For example, embodiments of the glass ceramic may enhance the path length of the light in the photovoltaic cell and thus increase the absorption of the light by the thin film. Optimal scattering behavior for thin film photovoltaic devices scatter the light at large angle while maintaining low backward scattering, this increases the path length via an oblique propagation in the thickness of the active layer and also creates condition for total internal reflection to prevent light from escaping from the photovoltaic cell.

Various embodiments will be further clarified by the following examples.

EXAMPLES

Glass samples were prepared according to the as-batched composition, in weight percent, shown in Table 1.

TABLE 1

| Component | S1 | S2 | S3 |
|---|---|---|---|
| $SiO_2$ | 70 | 80 | 65.0 |
| $Al_2O_3$ | 20 | 20 | 22 |
| $Li_2O$ | 2.4 | 2.4 | 2.4 |
| MgO | 2.6 | 2.6 | 0 |
| ZnO | 1.3 | 1.3 | 2.5 |
| BaO | 0 | 0 | 2 |
| $ZrO_2$ | 2.6 | 2.2 | 2.6 |
| $SnO_2$ | 1.4 | 1.4 | 1 |
| $P_2O_5$ | 3 | 3 | 0 |

TABLE 1-continued

| Component | S1 | S2 | S3 |
|---|---|---|---|
| $Ta_2O_5$ | 0 | 1 | 0 |
| $B_2O_3$ | 0 | 0 | 1 |

Thermal treatments used to treat the glass samples are outlined in Table 2.

TABLE 2

| Cycle A | Cycle B | Cycle C |
|---|---|---|
| Heating to 660° C.: 30° C./min | Heating to 780° C.: 3° C./min | Heating to 660° C.: 30° C./min |
| Heating to 725° C.: 3° C./min | Dwell: 1 hour | Heating to 725° C.: 3° C./min |

TABLE 2-continued

| Cycle A | Cycle B | Cycle C |
|---|---|---|
| Heating to 820° C.: 12° C./min | Heating to 925° C.: 12° C./min | Heating to 820° C.: 12° C./min |
| Dwell: 10 min | Dwell: 1 hour | Dwell: 10 min |
| Heating to 900° C.: 15° C./min | Cooling to room temperature | Heating to 925° C.: 15° C./min |
| Dwell: 15 min | | Dwell: 1 h |
| Cooling until room temperature | | Cooling to 600° C.: 20 min |
| | | Cooling to room temperature: natural cooling |

Figure 2:
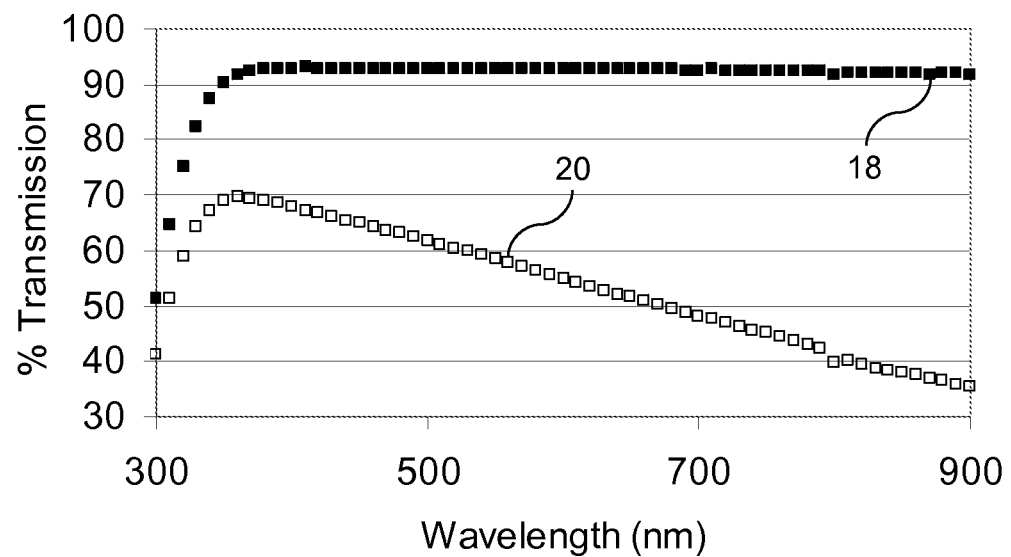
FIG. 2 is a graph of diffuse and total transmission as a function of wavelength for one embodiment, S2-C.
Figure 3:
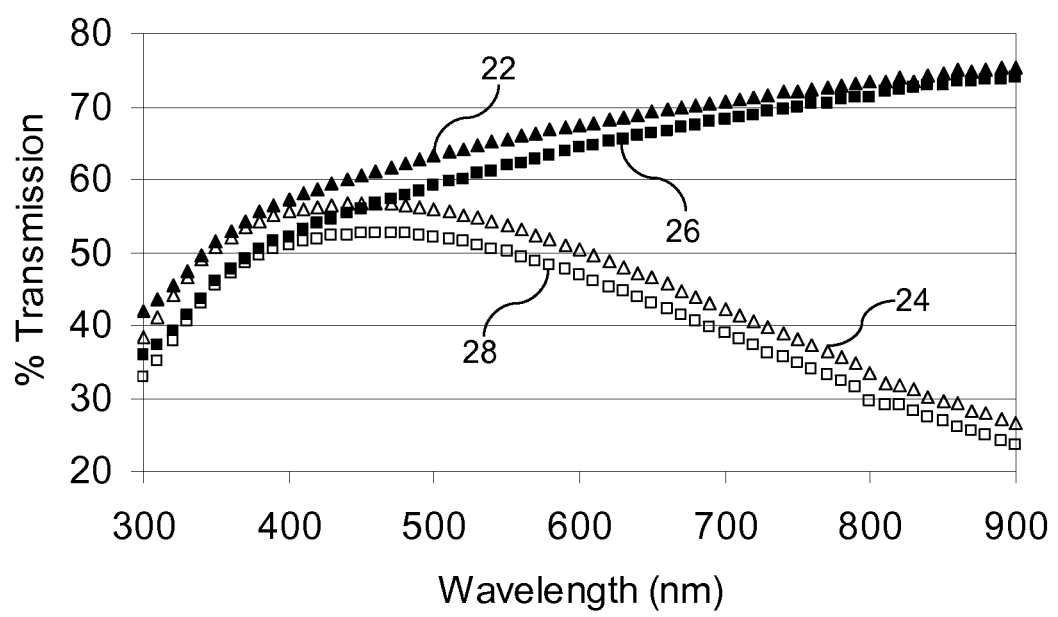
FIG. 3 is a graph of diffuse and total transmission as a function of wavelength for two embodiments, S3-B and S3-C.

After thermal treatments, X-Ray diffraction (XRD), scanning electron microscopy (SEM) and transmission measurements were completed on the glass-ceramics. XRD diagrams were collected by the X-Pert Pro with the following configuration: copper tube, power 45 kV/40 mA/λ=1.540593 Å, 2θ=5-140°, step=0.008°, time/step=40 s/opening=1/4, Detector=X-Celerator. Rietveld analysis was performed in order to affine the phases and establish their right composition. SEM analysis was performed on polished cross-section samples. Transmission measurements were completed using a CARY 500 spectrophotometer from Varian. The wavelength range from 175 nm to 3300 nm was scanned using a tungsten halogen and a deuterium UV source. FIGS. 1-3 show percent transmission, diffuse and total, as a function of wavelength for the 5 samples tested, S1-B, S2-A+B, S2-C, S3-B and S3-C.

Table 3 summarizes the properties of each glass ceramic after the applied thermal treatment.

TABLE 3

| glass | S1 | S2 | S2 | S3 | S3 |
|---|---|---|---|---|---|
| thermal treatment | B | A + B | C | B | C |
| refractive index | 1.521 | 1.522 | 1.512 | 1.542 | 1.536 |
| mean particle size | ~1 micron | ~1 micron | ~1 micron | ~1 micron | ~1 micron |
| distance between particles | 1-5 micron | 0-5 micron | 2-10 micron | few nm | few nm |
| crystalline phase (XRD) | β-quartz, Petalite | β-quartz, Petalite | β-quartz | β-quartz, β-spodumene, $ZrSnO_4$ | β-quartz, $ZrSnO_4$ or $ZnO_2$ |

As shown in FIG. 1, high total transmission was observed for S1-B (graph 14) and S2-A+B (graph 10). High diffuse transmission was also observed for S1-B (graph 12) and S2-A+B (graph 16). S1 was thermally treated according to cycle B and S2 was thermally treated according to cycles A and B successively. Most of the transmission was diffused. The size of the particles as well as the dispersion into the matrix appeared to be optimized. Particles were round-shape and their size was regular, with a diameter close to 1 micron. The distance between particles was 1 to 5 microns. The crystallized part appeared to be optimized and the particles were well-dispersed into the matrix.

As shown in FIG. 2, sample S1-C exhibited low diffuse transmission (graph 20) and high total transmission (graph 18), indicating that the mean free path (MFP) is too long. The fact that the diffuse transmission decreases with the wavelength is due to the dependency of the mean free path to the wavelength; the MFP will increase with increasing wavelength (in other words longer wavelength see less particles than smaller wavelength). This phenomenon could be due to the low degree of crystallinity. The SEM pictures showed that the size of the particles for S2-C was approximately the same than for S2-A+B, but the density of particles was lower when cycle C was applied. The density of particles was confirmed to be a major parameter. For this composition the cycle C does not appear sufficient to nucleate enough particles.

As shown in FIG. 3, both S3-B (graph 22) and S3-C (graph 26) exhibited lower total transmission compared to the previous samples. The low value indicated absorption, back scattering (increasing the reflection of the glass), or both combined. Measurements on some of those glass ceramics indicated that the absorption is, at maximum, a few percent. So a low total transmission was due to a lot of back scattering (the MFP is really small such that it induces a higher reflectance of the overall substrate). The diffuse transmission was decreasing with the wavelength for S3-B (graph 24) and S3-C (graph 28). In this case, the transmission curves behavior could be due to the high crystallization of the materials. SEM experiments showed that the degree of crystallinity is high compare to the previous samples. The decrease of the diffusion curve could be due to the difference of index refraction between the crystallized particles and the residual matrix. High crystallization could be related to low $SiO_2$ level and/or presence of $B_2O_3$.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used on the specification and claims are to be understood as being modified in all instances by the term "about", whether or not so stated. It should also be understood that the precise numerical values used on the specification and claims form additional embodiments of the invention.

What is claimed is:

1. A glass ceramic comprising:
    a composition comprising, in weight percent;
    1.9-2.5% $Li_2O$;
    18-24% $Al_2O_3$;
    62-82% $SiO_2$; and
    1-1.5% $SnO_2$;
    wherein the glass ceramic is essentially free of $TiO_2$, and exhibits diffuse transmission greater than or equal to 20% from 400 nm to 1200 nm; and
    wherein the glass ceramic is colorless, essentially free of $TiO_2$, and exhibits diffuse transmission greater than or equal to 20% from 400 nm to 1200 nm; and
    wherein the glass ceramic is a bulk crystallized glass ceramic comprising crystals wherein the crystals have an average size from about 100 nm to about 2 μm and an average spacing of about 1 to 5 μm.

2. The glass ceramic of claim 1 having greater than 65% diffuse transmission from 400 nm to 700 nm.

3. The glass ceramic of claim 1 having greater than 60% total transmission from 400 nm to 700 nm.

4. The glass ceramic of claim 1 having greater than 60% diffuse transmission from 400 nm to 1200 nm.

5. The glass ceramic of claim 1 having greater than 80% total transmission from 400 nm to 1200 nm.

6. The glass ceramic of claim 1,
    wherein the glass ceramic comprises 5-60 percent crystallization.

7. The glass ceramic of claim 1, wherein the glass ceramic is essentially free of arsenic and fluorine.

8. A process for making a glass ceramic comprising:
    preparing a glass wherein the composition comprises, in weight percent:
    1.9-2.5% $Li_2O$;
    18-24% $Al_2O_3$;
    62-82% $SiO_2$;
    1-1.5% $SiO_2$; and
    wherein the glass is essentially free of $TiO_2$ and exhibits diffuse transmission greater than or equal to 20% from 400 nm to 1200 nm; and
    thermally treating the glass to nucleate and grow crystals and form the glass ceramic, wherein the crystals have an average size from about 100 nm to about 2 μm and an average spacing of about 1 to 5 μm.

9. The process of claim 8, which comprises heating the glass in a temperature range of 680° C. to 800° C. for at least a period of 15 minutes to nucleate the crystals.

10. The process of claim 8, which comprises heating the glass in a temperature range of 880° C. to 950° C. for at least a period of 15 minutes to grow the crystals.

11. An OLED device comprising the glass ceramic of claim 1.

* * * * *

UNITED STATES PATENT AND TRADEMARK OFFICE
CERTIFICATE OF CORRECTION

PATENT NO. : 8,461,068 B2  Page 1 of 1
APPLICATION NO. : 12/759147
DATED : June 11, 2013
INVENTOR(S) : Etienne Almoric et al.

It is certified that error appears in the above-identified patent and that said Letters Patent is hereby corrected as shown below:

In the Claims

*Col.*  *Line*  Claim 1
8  4  "wherein the glass ceramic is colorless, essentially free of Ti02, and exhibits diffuse transmission greater than or equal to 20% from 400 nm to 1200 nm; and" – should be deleted Signed and Sealed this
Twenty-third Day of June, 2015

Michelle K. Lee
*Director of the United States Patent and Trademark Office*